United States Patent
Wilde et al.

(10) Patent No.: US 8,452,471 B2
(45) Date of Patent: May 28, 2013

(54) PROCESS FOR OPERATING A HYBRID VEHICLE

(75) Inventors: Andreas Wilde, Munich (DE); Torsten Herzog, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 5 days.

(21) Appl. No.: 13/043,004

(22) Filed: Mar. 8, 2011

(65) Prior Publication Data

US 2011/0160946 A1 Jun. 30, 2011

Related U.S. Application Data

(63) Continuation of application No. PCT/EP2009/007331, filed on Oct. 13, 2009.

(30) Foreign Application Priority Data

Nov. 12, 2008 (DE) .................. 10 2008 056 858

(51) Int. Cl.
- *B60L 9/00* (2006.01)
- *B60L 11/00* (2006.01)
- *G05D 1/00* (2006.01)
- *G05D 3/00* (2006.01)
- *G06F 7/00* (2006.01)
- *G06F 17/00* (2006.01)

(52) U.S. Cl.
USPC ............ 701/22; 701/117; 701/400; 701/408; 903/903; 903/906; 903/907; 180/65.1; 180/65.21; 180/65.29

(58) Field of Classification Search
USPC ............ 701/22–25, 117–119, 200, 201, 207, 701/400, 408, 409, 414, 415, 423; 903/903–907; 180/65.1–65.8; 340/905, 933, 340/995.13
See application file for complete search history.

(56) References Cited

U.S. PATENT DOCUMENTS

| | | | |
|---|---|---|---|
| 5,696,502 A | 12/1997 | Busch et al. | |
| 6,687,607 B2 | 2/2004 | Graf et al. | |

(Continued)

FOREIGN PATENT DOCUMENTS

| | | |
|---|---|---|
| DE | 44 08 547 A1 | 10/1995 |
| DE | 198 07 291 A1 | 8/1999 |

(Continued)

OTHER PUBLICATIONS

German Search Report dated Jul. 22, 2009 with partial English translation (nine (9) pages).

(Continued)

*Primary Examiner* — Thomas Tarcza
*Assistant Examiner* — Rami Khatib
(74) *Attorney, Agent, or Firm* — Crowell & Moring LLP

(57) ABSTRACT

A process for operating a hybrid vehicle in an internal-combustion-engine-driven mode and/or in an electric-motor-driven mode, wherein, on a route section to be traveled and considered for driving in the electric-motor-driven mode, a change to the electric-motor-driven mode will take place only when a threshold value is exceeded which represents, or correlates with the efficiency advantage achievable on the route section by a change from the internal-combustion-engine-driven mode to the electric-motor-driven mode. Starting from the instantaneous position of the hybrid vehicle, the route is examined in an anticipatory manner with respect to such a route section, wherein the threshold value is adapted when such a route section was recognized and a driving through the route section in the electric driving mode would likely lead to a lowering of the state of charge of an electric energy accumulator into a critical state of charge range.

14 Claims, 1 Drawing Sheet

U.S. PATENT DOCUMENTS

| | | | |
|---|---|---|---|
| 8,326,474 B2 * | 12/2012 | Schrey et al. | 701/22 |
| 2004/0030471 A1 | 2/2004 | Faye | |
| 2005/0274553 A1 * | 12/2005 | Salman et al. | 180/65.2 |
| 2008/0183348 A1 * | 7/2008 | Arita et al. | 701/22 |
| 2009/0012664 A1 * | 1/2009 | Christ | 701/22 |
| 2011/0029356 A1 * | 2/2011 | Hyde et al. | 705/14.1 |

FOREIGN PATENT DOCUMENTS

| | | |
|---|---|---|
| DE | 198 31 487 C1 | 3/2000 |
| DE | 100 35 027 A1 | 1/2002 |
| DE | 101 28 758 A1 | 12/2002 |
| DE | 102 26 143 A1 | 1/2004 |
| EP | 1 270 303 A2 | 1/2003 |
| WO | WO 2009/006983 A1 | 1/2009 |

OTHER PUBLICATIONS

International Search Report dated Jan. 27, 2010 with English translation (four (4) pages).

* cited by examiner

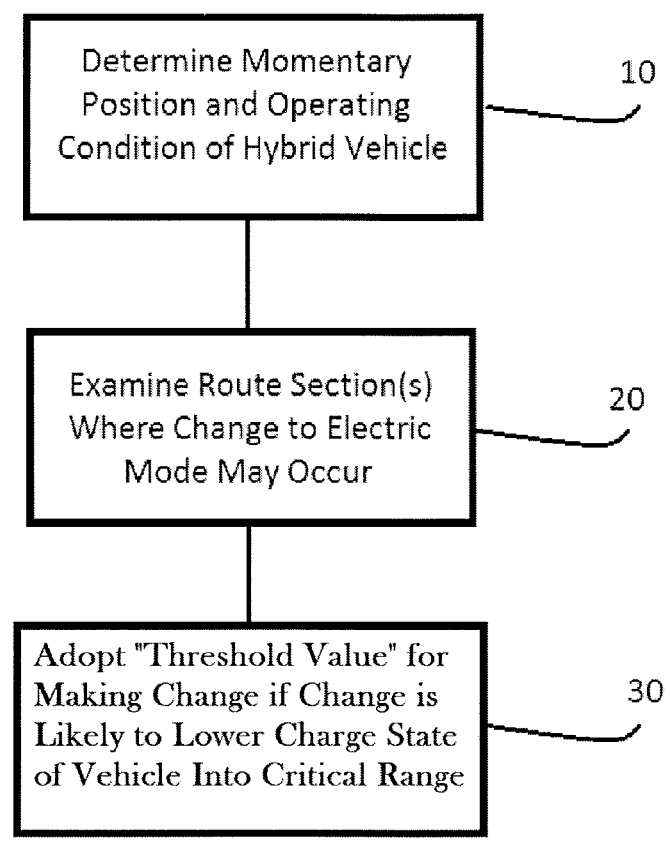

PROCESS FOR OPERATING A HYBRID VEHICLE

CROSS-REFERENCE TO RELATED APPLICATIONS

This application is a continuation of PCT International Application No. PCT/EP2009/007331, filed Oct. 13, 2009, which claims priority under 35 U.S.C. §119 from German Patent Application No. DE 10 2008 056 858.9, filed Nov. 12, 2008, the entire disclosures of which are herein expressly incorporated by reference.

BACKGROUND AND SUMMARY OF THE INVENTION

The present invention relates to a process for operating a hybrid vehicle, particularly a so-called full hybrid that can be operated in an internal-combustion-engine-driven mode and/or in an electric-motor-driven mode.

It is known that hybrid vehicles are distinguished by the combination of an internal-combustion engine and at least one electric motor. So-called full hybrids optionally permit driving by means of only the internal-combustion engine, only electric-motor driving, during which the internal-combustion engine is uncoupled or switched off, and a combined driving during which the internal-combustion engine is assisted by the at least one electric motor. Operating strategies of full-hybrid vehicles for the purpose of saving fuel change into the "electric-driving" operating mode when the driving power desired by the driver is comparatively low, the state of charge of the battery is relatively high and other basic parameters, such as the instantaneous vehicle speed, the battery temperature, etc. permit it.

Even on relatively short routes having a length of far less than 5 kilometers, purely electric driving requires more energy than today's energy accumulators can normally supply. In fairly long traffic jams or fairly long slow-driving phases, such as steadier traffic zones, the lack of energy can rapidly result in a limitation or termination of the "electric-driving" operating condition.

It is an object of the invention to indicate a process for the operation of a hybrid vehicle, wherein electric driving can take place as long as possible in phases of traffic jams and/or slow driving.

This and other objects are achieved by a process for operating a hybrid vehicle that can be operated in an internal-combustion-engine-driven mode and/or in an electric-motor-driven mode. On a route section to be traveled and considered for driving in the electric-motor-driven mode, a change to the electric-motor-driven mode will take place only when a threshold value is exceeded which represents the efficiency advantage achievable on the route section by a change from the internal-combustion-engine-driven mode to the electric-motor-driven mode. Starting from the instantaneous position of the hybrid vehicle, the route is examined in an anticipatory manner with respect to such a route section, wherein the threshold value is adapted when such a route section was recognized, and a driving through the route section in the electric driving mode would probably lead to a lowering of the state of charge of the electric energy accumulator into a critical state of charge range.

The invention recognizes that the energy saving potential existing in the electric driving operation in comparison to the driving operation using an internal-combustion engine will be the greater the lower the driving power demanded by the driver. The invention therefore consists of "distributing", in the event of a threatened lack of stored energy, the electric energy in a manner that is as anticipatory as possible to those route sections in which the efficiency advantage of the electric-motor driving is particularly high in comparison to driving using the internal-combustion engine. In other words, in the event of an anticipated or expected lack of electric energy, the "electric driving operation window" is limited in comparison to conditions in which sufficient electric energy is present in the accumulator, which results in an improved utilization of the existing electric energy.

As a result of an anticipatory limitation of the electric driving to route sections with very low driving power, energy for the (limited) electric driving will be available for longer periods of time. The energy present in the electric energy accumulator is therefore not "wasted" at high driving powers demanded by the driver at which, although the specific consumption advantage of the electric driving exists, it is comparatively low, but this energy is preferably used in a targeted manner at lower driving powers demanded by the driver, which is advantageous with respect to energy and permits electric driving for a longer period of time.

Other objects, advantages and novel features of the present invention will become apparent from the following detailed description of one or more preferred embodiments when considered in conjunction with the accompanying drawings.

BRIEF DESCRIPTION OF THE DRAWING

The FIGURE is a flowchart illustrating an exemplary process for operating a hybrid vehicle according to the invention.

DETAILED DESCRIPTION OF THE DRAWING

In the case of full-hybrid vehicles, purely electric driving is normally possible only at comparatively low speeds, for example, less than 60 km/h. At speeds below the predefined "limit speed", at which purely electric driving is possible, according to the invention a "switch-over" from the operating mode of the internal-combustion engine to the operating mode of the electric motor, for efficiency reasons, will take place only when a "threshold value" is exceeded. The threshold value represents the efficiency advantage achievable in the operating mode of the electric motor in comparison to the operating mode of the internal-combustion engine, or correlates with it.

The term "threshold value", which for reasons of simplicity is always used only in the singular herein, should be interpreted extremely broadly. The "threshold value" may be a single parameter, a parameter set or a vector, i.e., several parameters, a bandwidth of a parameter or bandwidths of several parameters. An average vehicle speed can be used as the "threshold value", which is assumed, estimated or approximately predicted for the concerned imminent route section and/or the average driving power or the like demanded by the driver.

Referring to the FIGURE, an exemplary process according to the invention is such that, based on the momentary position and on the momentary operating condition of the hybrid vehicle (step 10), the route is examined in an anticipatory fashion with respect to a route section or with respect to the nearest route section where a change into the electric-motor driving mode may probably be considered (step 20), and the "threshold value" from which a change actually takes place into the electric-motor operating mode is "adapted" when such a route section was recognized and a driving through the route section in the electric operating mode would probably lead to a lowering of the state of charge of the electric energy accumulator into a critical state of charge range (step 30).

The "horizon" within which the route is examined in an anticipatory manner may, for example, amount to n times the route which could maximally be driven in the electric driving mode at the instantaneous actual state of charge. In this case, "n" is a real positive number greater than 1.

If, for example, a traffic jam phase is noticed in advance at a distance of several kilometers, in which purely electric driving will be possible or basically sensible with respect to energy, and sufficient electric energy is not available in the electric energy accumulator for ensuring that the entire length of the route of the expected traffic jam phase can be traveled purely electrically, the "threshold value" or "threshold value set" relevant to the switch-over into the purely electric driving mode will be adapted. In this context, "adapting" means that, for example, the vehicle speed from which the switch-over takes place into the electric operating mode will be reduced in comparison to conditions in which sufficient electric energy is present in the accumulator.

As an alternative or in addition, it can be provided that, within the scope of the threshold value adaptation, the desired state of charge of the battery is raised even before the concerned route section has been reached, so that, when the corresponding route section has been reached, more electric energy will be available in the accumulator and a purely electric driving can take place for a longer period of time in the traffic jam phase, or so that, if possible, the entire traffic jam phase can be traveled purely electrically. Therefore, if a route section considered for an electric driving is recognized within the scope of the anticipatory route analysis, the electric energy accumulator can be charged in a targeted manner in time, i.e. before the corresponding route section has been reached, in the operating mode of the internal-combustion engine, in order to thereby raise the "energy lead" for the imminent electric driving. The thereby "limited energy absorption capacity" of the accumulator has practically no disadvantage in the traffic jam because hardly any braking energy can be recuperated anyhow at low speeds.

At the end of the traffic jam phase or slow-driving phase, the threshold value or threshold value set can be reset to the predefined initial value(s). Such a "threshold reset" can be carried out, for example, when the speed of the hybrid vehicle is above a predefined speed at least for a predefined time period or when the vehicle electronic system can otherwise recognize that the traffic jam phase or slow-driving phase has come to an end.

The decision as to whether a driving through the route section considered for "electric driving" will probably result in a lowering of the state of charge into a critical state of charge range can be made on the basis of predefined rules and general and/or up-to-date traffic information available for the actual route section. It may be known, for example, from a telematics or navigation system that a speed limit of, for example, 30 km/h exists on a certain route section. From a traffic information system by way of which up-to-date traffic data are "fed" into the vehicle, for example, the information may be known that a traffic jam and thus a slow-moving traffic exists on the concerned route section.

The decision as to whether a driving through the route section will probably result in a lowering of the state of charge into a critical state of charge range can be made on the basis of an estimated speed profile assumed or existing for the concerned route section and the state of charge derived therefrom which is to be expected at the currently set threshold value at the end of the concerned route section.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a hybrid vehicle operable in an internal combustion engine driven mode, an electric motor driven mode, and a hybrid internal combustion engine and electric motor driven mode, the process comprising the acts of:
   examining, by a vehicle electronic system of the hybrid vehicle, an upcoming route section to be traveled beginning with an instantaneous position of the hybrid vehicle, which route section is considered for driving in only the electric motor driven mode; and
   adapting, by the vehicle electronic system, a threshold value used to change the operation of the hybrid vehicle into the electric motor driven mode, which threshold value represents an efficiency advantage achievable on the examined route section by changing from the internal-combustion engine driven mode to the electric motor driven mode, said adapting of the threshold value occurring if a drive through the examined route section in the electric driving mode would likely lead to a lowering of a charge state of an electric energy accumulator of the hybrid vehicle into a critical charge state range; and
   changing the operation of the hybrid vehicle into the electric motor driven mode only when the adapted threshold value has been exceeded.

2. The process according to claim 1, wherein determining whether the driving through the route section will likely lower the charge state into the critical charge state range is based upon predefined rules and at least one of general and up-to-date traffic information available for the route section.

3. The process according to claim 2, wherein the process determines that the charge state will fall into the critical charge state range when one of a traffic jam and a predefined speed limit exists on the route section.

4. The process according to claim 3, wherein congestion is considered to be a traffic jam if the congestion is longer than a predefined route.

5. The process according to claim 4, wherein the congestion is also considered to be a traffic jam if an average speed within the congestion along the route section is lower than a predefined speed.

6. The process according to claim 3, wherein congestion is considered to be a traffic jam if an average speed within the congestion on the route section is lower than a predefined speed.

7. The process according to claim 1, wherein the decision of whether driving through the route section will likely lower the charge state into the critical charge state range is made utilizing an assumed speed profile for the concerned route section, wherein the charge state occurring at the end of the concerned route section is calculated.

8. The process according to claim 7, wherein the speed profile is a stored speed profile existing for the route section.

9. The process according to claim 8, wherein the stored speed profile is updated based on up-to-date traffic information received by the hybrid vehicle for the route section.

10. The process according to claim 7, wherein the speed profile is generated based on up-to-date traffic information received by the hybrid vehicle.

11. The process according to claim 1, wherein the critical charge state range is defined as a state of charge range below a fixed predefined limit value.

12. The process according to claim 1, wherein the examined upcoming route section is approximately n times a route maximally drivable in the electric-motor-driven mode based on an actual charge state of the electric energy accumulator, wherein n is greater than 1.

13. The process according to claim 12, wherein n is an integer greater than 1.

14. The process according to claim 1, wherein the threshold value relates to a speed of the hybrid vehicle.

\* \* \* \* \*